(12) United States Patent
 Zhang et al.

(10) Patent No.: US 9,302,338 B2
(45) Date of Patent: Apr. 5, 2016

(54) METHOD FOR MANUFACTURING METAL PARTS AND MOLDS AND MICRO-ROLLER USED THEREFOR

(71) Applicant: HUAZHONG UNIVERSITY OF SCIENCE AND TECHNOLOGY, Wuhan (CN)

(72) Inventors: Haiou Zhang, Wuhan (CN); Guilan Wang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 676 days.

(21) Appl. No.: 13/651,509

(22) Filed: Oct. 15, 2012

(65) Prior Publication Data

US 2013/0197683 A1    Aug. 1, 2013

Related U.S. Application Data

(63) Continuation-in-part of application No. PCT/CN2011/072524, filed on Apr. 8, 2011.

(30) Foreign Application Priority Data

Apr. 15, 2010    (CN) .......................... 2010 1 0147632

(51) Int. Cl.
 *G06F 17/50*    (2006.01)
 *B23K 9/04*    (2006.01)
 (Continued)

(52) U.S. Cl.
 CPC ............... *B23K 9/044* (2013.01); *B22F 3/1055* (2013.01); *B23K 10/006* (2013.01);
 (Continued)

(58) Field of Classification Search
 CPC ...... B22F 2999/00; B22F 3/1055; B22F 3/20; B23K 26/3206; B23K 26/3273; B23K 9/044
 See application file for complete search history.

(56) References Cited

U.S. PATENT DOCUMENTS 5,398,193 A * 3/1995 deAngelis ..................... 700/119
2009/0174709 A1* 7/2009 Kozlak et al. ................. 345/420
(Continued)

OTHER PUBLICATIONS

Zhang, Yu. "Mechanical property of fused deposition parts." (2002).*
(Continued)

*Primary Examiner* — Aniss Chad
(74) *Attorney, Agent, or Firm* — Matthias Scholl, PC; Matthias Scholl

(57) ABSTRACT

A method for manufacturing parts and molds by: 1) slicing a three-dimensional CAD model of a part or mold; 2) planning a modeling path according to slicing data of the three-dimensional CAD model, whereby generating numerical control codes for modeling processing; and 3) performing fused deposition modeling of powders or wire material of metal, intermetallic compounds, ceramic and composite functional gradient materials by layer using a welding gun on a substrate layer via a numerical control gas shielded welding beam or laser beam according to a track specified by the numerical control code for each layer. A micro-roller or a micro-extrusion unit is installed at a contact area between melted and softened areas. The micro-roller or the micro-extrusion unit synchronously moves along with fused deposition area, which results in compressing and processing of the fused deposition area during the fused deposition modeling.

6 Claims, 1 Drawing Sheet

(51) Int. Cl.
*B22F 3/105* (2006.01)
*B29C 67/00* (2006.01)
*B23K 10/00* (2006.01)
*B23K 26/34* (2014.01)
*B23K 35/30* (2006.01)
*B23K 35/02* (2006.01)
*B23K 26/32* (2014.01)

(52) U.S. Cl.
CPC .............. *B23K 26/32* (2013.01); *B23K 26/322* (2013.01); *B23K 26/342* (2015.10); *B23K 26/345* (2013.01); *B23K 35/0244* (2013.01); *B23K 35/3053* (2013.01); *B23K 35/3066* (2013.01); *B29C 67/0055* (2013.01); *B22F 2003/1056* (2013.01); *B22F 2999/00* (2013.01); *B23K 2201/34* (2013.01); *B23K 2203/16* (2013.01); *B23K 2203/50* (2015.10); *B23K 2203/52* (2015.10)

(56) References Cited

U.S. PATENT DOCUMENTS

2009/0271323 A1* 10/2009 Zinniel et al. .................... 705/80
2011/0046764 A1* 2/2011 Kan ................................ 700/98
2013/0138234 A1* 5/2013 Dufort et al. .................... 700/98

OTHER PUBLICATIONS

Hamade, R. F., et al. "Modelangelo: a subtractive 5-axis robotic arm for rapid prototyping." Robotics and Computer-Integrated Manufacturing 21.2 (2005): 133-144.*

* cited by examiner

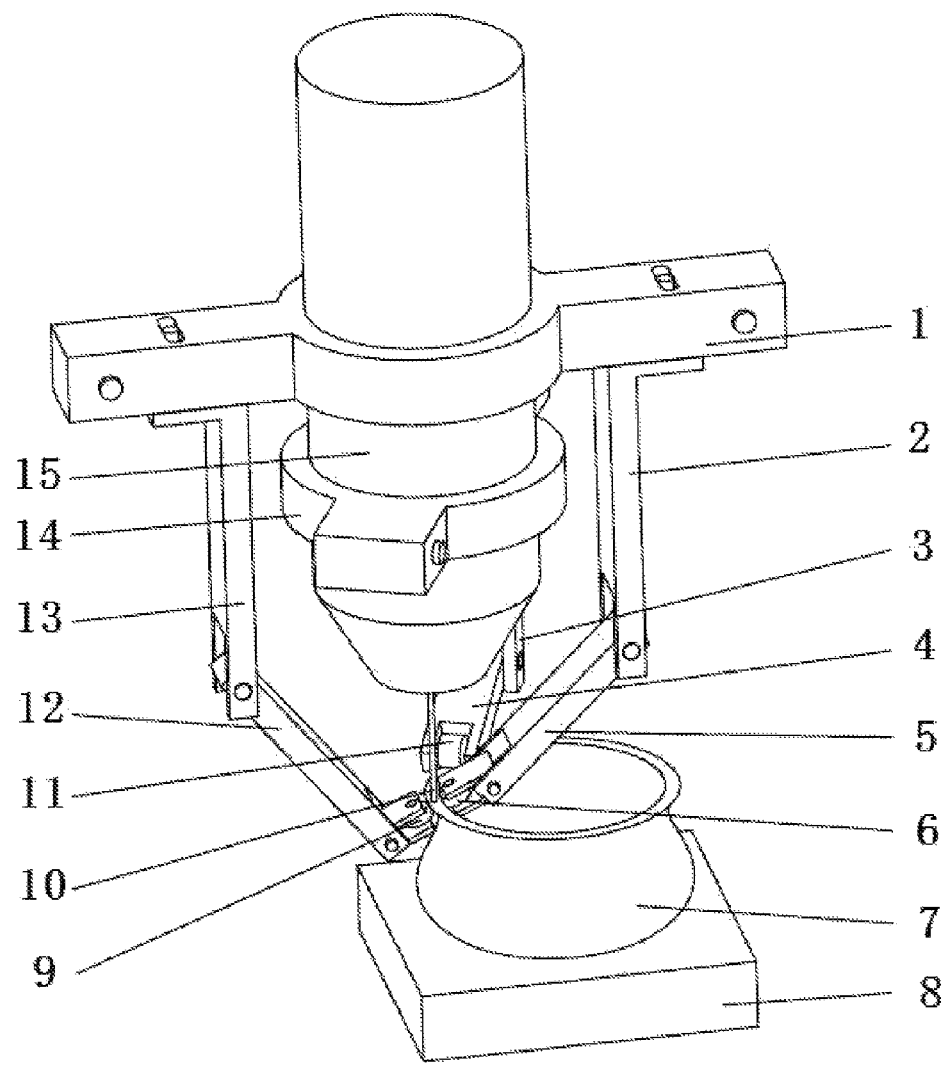

METHOD FOR MANUFACTURING METAL PARTS AND MOLDS AND MICRO-ROLLER USED THEREFOR

CROSS-REFERENCE TO RELATED APPLICATIONS

This application is a continuation-in-part of International Patent Application No. PCT/CN2011/072524 with an international filing date of Apr. 8, 2011, designating the United States, now pending, and further claims priority benefits to Chinese Patent Application No. 201010147632.2 filed on Apr. 15, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for manufacturing a part and a mold and a micro-roller related thereto.

2. Description of the Related Art

Dieless fused deposition modeling methods are widely used in producing high intensity metal parts or molds. However, there are several problems with the existing methods: flowing, dropping or crumbling of fused deposition materials caused by the gravity, and cracking, deformation, large residual stress and unstable organization performance generated by rapid heating and rapid cooling during dieless fused deposition growth modeling severely affect modeling performance and accuracy.

SUMMARY OF THE INVENTION

In view of the above-described problems, it is one objective of the invention to provide a method for manufacturing parts and molds capable of addressing problems, such as flowing, dropping, or crumbling of fused deposition materials caused by the gravity, and cracking, deformation, large residual stress and unstable organization performance caused by rapid heating and rapid cooling during dieless multi-layer fused deposition modeling.

To achieve the above objective, in accordance with one embodiment of the invention, there provided is a method for manufacturing parts and molds, the method comprising:

(1) Model Slicing:
  slicing a three-dimensional CAD model of a part or mold according to requirements for dimensional accuracy of the three-dimensional CAD model of the part or the mold;

(2) Generation of Numerical Control Codes:
  planning a modeling path according to slicing data of the three-dimensional CAD model, and characteristics of size and shape of each layer, whereby generating numerical control codes for modeling processing;

(3) Fused Deposition Modeling:
  performing fused deposition modeling of powders or wire material of metal, intermetallic compounds, ceramic and composite functional gradient materials by layer using a welding gun on a substrate layer via a numerical control gas shielded welding beam or laser beam according to a track specified by the numerical control code for each layer;

wherein
  a micro-roller or a micro-extrusion unit is installed at a contact area between melted and softened areas under the action of the gas shielded welding beam or the laser beam; the micro-roller or the micro-extrusion unit synchronously moves along with fused deposition area whereby compressing and processing the fused deposition area during the fused deposition modeling; and
  synchronously performing the fused deposition modeling and processing, until requirements for dimension and surface accuracy of the part or the mold are met.

In a class of this embodiment, if a formed body cannot meet requirements for the dimension and surface accuracy requirements of the part or the mold, grinding and polishing is performed on the formed body layer by layer or in a manner of segmentation during the modeling process, until requirements for the dimension and surface accuracy of the part or the mold are met.

In a class of this embodiment, in the fused deposition modeling, the welding gun is a plasma gun, a gas shielded gun, or a laser welding head; the metal is metal or alloy material that can be used in gas shielded welding or laser welding; the intermetallic compound is an intermetallic compound material that can be used for surface cladding; the ceramic is a ceramic material that can be used for surface cladding; and the composite functional gradient material is a material integrating the above metal, intermetallic compound and ceramic, or a material with gradient varied composition after integrating.

In a class of this embodiment, the micro-roller or the micro-extrusion unit is fixed on a head of the welding gun, and in the fused deposition modeling by layer by layer process, the micro-roller or the micro-extrusion unit move synchronically with the welding gun so that the side vertical roller among the micro-roller or the clamping plate of the micro-extrusion unit follows on the side of the welded and softened areas acting as a continuous casting crystallizer and a guide. Moreover, the flowing of the welded material in a molten pool can be limited by adjusting the pitch and angle according to the wall thickness and profile of the part or mold in order to avoid the flowing, dropping, crumbling problem caused by the gravity in occasions without support. Accordingly, it ensures the formability of a complex shape part, and can improve the accuracy of the side surface. If need to further improve the layer height accuracy, surface quality, formability and organizational performance of the fused deposition layer, the horizontal roller (or roller group) with a hole among the micro-roller or the clamping plate of the micro-extrusion unit should be always kept to contact with the semi-solid softened area near the rear of the melting pool. Through applying plastic deformation on this area, the accuracy and surface smoothness of the fused deposition layer are improved, the additional tensile strength of the weld bead and its adjacent area are reduced, and the deformation and cracks and improve the organizational performances are prevented.

In a class of this embodiment, the micro-roller or the micro-extrusion unit is fixed on a numerical control processing head or a robot wrist, and in the fused deposition modeling process, the numerical control processing head or the robot wrist moves synchronically with the welding gun so that the micro-roller or the micro-extrusion unit moves synchronically with the welding gun and the side vertical roller among the micro-roller or the clamping plate of the micro-extrusion unit follows on the side of the welded and softened areas. Moreover, the flowing, dropping, or crumbling problem for the complex shape part when there is no support and direct modeling can be avoid by adjusting the pitch and angle according to the wall thickness and profile of the part or mold. Accordingly, it ensures the formability of any complex shape part, and can improve the accuracy of the side surface. If need to further improve the layer height accuracy, surface quality, formability and organizational performance of the fused deposition layer, the horizontal roller (or roller group) with hole among the micro-roller or the clamping plate of the micro-extrusion unit can track the semi-solid softened area near the rear of the melting pool. Through applying plastic deformation on this area, the additional tensile strength of the weld bead and its adjacent area are reduced, the deformation and cracks are avoided, and the dimensional accuracy and improve the organizational performances are improved.

On some occasions where only one side needs to be compressed, for example, in the fused deposition modeling of a mold, some recessed profile can be shaped by the assistant of a single-sided micro-roller or micro-extrusion unit. In addition, the repair of the part or mold can be carried by the above method and auxiliary micro-compressed shaping device.

It is another objective of the invention to provide a micro-roller for manufacturing parts and molds using the method. The micro-roller comprises a left vertical roller, a right vertical roller, and a horizontal roller. The left and right vertical rollers are respectively connected with a left and a right rotating arms through shaft pins, and the left and right rotating arms are respectively connected with a left and a right vertical arms which are fixedly connected on a first bracket; the horizontal roller is connected with a back rotating arm through a shaft pin, and the back rotating arm is connected with a back vertical arm which is fixedly connected on a second bracket.

In a class of this embodiment, the first and second brackets are fixed on a head of a welding gun, or fixed on a numerical control processing head or a robot wrist which keeps synchronically with the welding gun.

In the fused deposition modeling by layer-by-layer process, the micro-roller moves synchronously with the welding gun so that the side vertical roller follows on the side of the welded and softened areas acting as a continuous casting crystallizer and a guide. Moreover, the flowing of the welded material in molten pool can be limited by adjusting the pitch and angle according to the wall thickness and profile of the part or mold in order to avoid the flowing, dropping, crumbling problem caused by the gravity in the no support occasion. Accordingly, it ensures the formability of a complex shape part, and can improve the accuracy of the side surface. If need to further improve the layer height accuracy, surface quality, formability and organizational performance of the fused deposition layer, the horizontal roller with hole among the micro-roller should be always kept to contact with the semi-solid softened area near the rear of the melting pool. Through applying plastic deformation on this area, it can improve the accuracy and surface smoothness of the fused deposition layer, reduce the additional tensile strength of the weld bead and its adjacent area, and avoid the deformation and cracks and improve the organizational performances.

By using gas shielded welding (for example, TIG, plasma arc welding, metal active-gas welding, metal inert-gas welding) or high-powered laser modeling, this invention is used to cause the semi-molten/softened area and its adjacent area to occur roller forced deformation or squeeze forced deformation with the micro-roller or micro-extrusion unit installed behind the melting pool during the no support and dieless fused deposition modeling process for melting powders or wire material. Accordingly, it generates compression stress and compressive strain state in order to avoid cracking, reduce or eliminate the residual stress, and improve the organizational performance. Meanwhile, the flowing of the welded material in the molten pool can be limited by the micro-roller or clamping plate installed at the both sides of the molten pool, that is to say the rheoforming is limited, thus the dropping, flowing, crumbling problem caused by the gravity in the no support occasion can be avoid in order to ensure the formability of a complex shape part, and achieve the direct modeling of some parts or molds with complex shapes such as its sidewall with hanging angle. The above limit can also effectively reduce the ladder effect for the surface of the formed body and improve the modeling accuracy and surface quality, so that less or non milling process is needed and only grinding or polishing is needed to meet the requirements of the dimension and surface accuracy of the parts.

The method still maintains the advantages of the gas shielded welding fused deposition modeling method which having higher modeling efficiency, lower cost and much easier to meet the full density for the formed body than the high-powered laser deposition modeling method and electronic beam deposition modeling method. In addition, because the high-powered laser fused deposition modeling method belongs to the no support and dieless fused deposition modeling technology so that it also exists the same problems such as the formation of complex shape parts, crack, organizational performance as the plasma fused deposition modeling method, the invention can be used in the high-powered laser fused deposition modeling to solve the above problems. Therefore, by adopting this invention, the parts or molds from metal, intermetallic compound, metal ceramic, ceramic and its composite functionally gradient material can be high-quality, quickly, and low-cost obtained.

The method can also be used to repair or strength the surface of parts or molds, and can overcome the technical bottleneck that the subsequent finishing process is very difficult to execute for the repair layer or strength layer after repairing or strengthening.

BRIEF DESCRIPTION OF THE DRAWINGS

The invention is described hereinbelow with reference to accompanying drawings, in which the sole FIGURE illustrates a micro-roller fixed on a welding gun.

DETAILED DESCRIPTION OF THE EMBODIMENT

Example 1

In the example, a TIG welding gun is used. The micro-roller fixed on the plasma welding gun move synchronously with the welding gun and the side vertical roller follows on the side of the melted and softened area. The welding current of the TIG welding gun is 60 A and uses a Fe—Ni—Cr alloy powder according to the operational performance requirements of the mold cavity to be fused deposition. According to the digital modeling path generated by the 3D CAD model of the mold, the fused deposition modeling and the shaping compressed by the micro-roller operation is synchronously excused layer by layer on the base. If the mold cavity is complex, a surface finishing process will be needed in the modeling process. Therefore, a milling and polishing operation is excused layer by layer or multi-layered segmented during the modeling process according to the milling and polishing path composited with the modeling path. This finishing process is excused alternately with the modeling process, until the modeling process is done and the dimension and surface accuracy meet the requirements. Regarding the male section of the mold, the finishing process and the above synchronous modeling process can be excuse alternately, until the male section modeling process is done and the dimension and surface accuracy meet the requirements. In addition, the finishing process can be excused after the modeling process, which depends on the shape complex degree of the male section.

Example 2

In the example, a metal gas-shielded welding gun is used. The micro-extrusion unit fixed on the welding gun moves synchronously with the welding gun and the clamping plate follows on the side of the melted and softened area. The welding current of the metal gas-shielded welding gun is 50 A and uses an aluminum alloy wire material. According to the digital modeling path generated by the 3D CAD model of the part, the fused deposition modeling and the shaping compressed by the micro-extrusion unit operation is synchronously excused layer by layer on the base. Based on the requirements of the refinement of the grains and the development of the organizational performance, this compound field modeling process can be performed under vibration condition. Regarding a complex shape region of the part, a milling and polishing operation is excused alternatively during the synchronic process according to the milling and polishing path composited with the modeling path, until the modeling process is done and the dimension and surface accuracy meet the requirements.

Example 3

In the example, a solid laser of 1000 W power is used. The micro-roller fixed on the laser head move synchronously with the laser head, so that the side vertical roller follows on the side of the melted and softened area and the horizontal roller with hole flexibly tracks the semi-solid softened area near the rear of the welding pool. According to the digital modeling path generated by the 3D CAD model of the part, the laser fused deposition modeling and the shaping compressed by the micro-roller operation is synchronously excused layer by layer on the base to process the high-temperature alloy part. If the part shape is complex, finishing process will be needed in the modeling process. Therefore, a milling and polishing operation is excused layer by layer or multi-layered segmented during the modeling process according to the milling and polishing path composited with the modeling path. This finishing process is excused alternately with the modeling process, until the modeling process is done and the dimension and surface accuracy meet the requirements.

Example 4

In the example, a powder feeder with gradient function and a plasma welding gun with transferred arc currency of 70 A are used. The micro-roller fixed on the wrist of a industrial robot which keep synchronously with the digital plasma welding gun used in the fused deposition modeling process, so that the side vertical roller follows on the side of the melted and softened area and the horizontal roller with hole flexibly tracks the semi-solid softened area near the rear of the welding pool. According to the digital modeling path generated by the 3D CAD model with the distribution information of the gradient functional material, nickel aluminum inter intermetallic alloy powder and nickel-based high-temperature alloy powder superalloy are excused synchronously the plasma fused deposition modeling and the shaping compressed by the micro-roller operation layer by layer to process the functionally gradient material part. Moreover, a milling and polishing operation is excused alternatively during the synchronic process according to the requirements of modeling accuracy and the surface quality, until the dimension and surface accuracy meet the requirements.

Example 5

A micro-roller used in examples 1, 3, 4, and 5 is shown in FIG. 1. The micro-roller comprises a left vertical roller 9, a right vertical roller 6, and a horizontal roller 11. The left vertical roller 9 and the right vertical roller 6 are respectively connected with a left rotating arm 12 and a right rotating arm 5 through axle pins, and the lift and right rotating arms are respectively connected with a left vertical arm 13 and a right vertical arm 2 which are fixedly connected on a first bracket 1.

The horizontal roller 11 is connected with a back rotating arm 4 through a shaft pin, and the back rotating arm 4 is connected with a back vertical arm 3 which is fixedly connected on a second bracket 14.

The example adopts a metal gas-shielded welding gun and a part 7 to be processed is placed on a base 8. The micro-roller fixed on a numerical control welding gun 15 moves synchronously with the welding gun so that the horizontal roller 11 with hole tracks flexibly the semi-solid softened area near the rear of the melting pool. The welding current of the metal gas-shielded welding gun is 60 A and uses a stainless steel welding wire 10 according to the operational performance requirements for the plastic mold to be repaired, so that the fused deposition modeling and the shaping process compressed by the micro-roller are execute synchronously on the surface of the mold to be repaired in accordance with the digital repair path obtained by the three-dimension CAD model of the mold. Because of the complexity of the mold cavity, finishing process of the surface is needed in the above synchronic repairing modeling process. Therefore, the milling and polishing operation is excused alternatively during the synchronic repairing modeling process according to the path, until the repairing modeling process is done and the dimension and surface accuracy meet the requirements.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for manufacturing a part comprising a plurality of layers, the method comprising:
   a) slicing a three-dimensional CAD model of the part into a plurality of slices to attain geometric data of said slices;
   b) generating modeling paths for said slices according to said geometric data, and generating numerical control codes for said modeling paths;
   c) depositing material via fused deposition modeling on a substrate layer, by driving a welding gun emitting a numerical control gas shielded welding beam or laser beam along one of said modeling paths specified by one of said numerical control codes, to attain fused deposited material having two side surfaces, a bottom surface, and a top surface, wherein said bottom surface contacts with said substrate layer, said top surface is opposite to said bottom surface, said two side surfaces extend between said bottom surface and said top surface, and said two side surfaces are opposite to each other; and
   d) applying extrusion forces on said fused deposited material by using a micro-roller or a micro-extrusion unit to cause a plastic deformation in said fused deposited material;

wherein:
   said micro-roller or said micro-extrusion unit synchronously moves along with said welding gun, whereby the step of depositing material and the step of applying extrusion forces on said fused deposited material are substantially synchronously conducted;

performing the substantially synchronous steps of depositing material and applying extrusion forces on said fused deposited material, until requirements for dimensions and surface quality of the part are met, whereby forming one of the plurality of layers; and the step of applying extrusion forces on said fused deposited material comprises applying extrusion forces on said two side surfaces and said top surface.

2. The method of claim 1, wherein, if a body formed by the plurality of layers does not meet the requirements for dimensions and surface quality of the part, grinding and polishing the plurality of layers in a layer-by-layer way or in a manner of segmentation, until the requirements for dimensions and surface quality of the part are met.

3. The method of claim 2, wherein:
said welding gun is a plasma gun, a gas shielded gun, or a laser welding head;
said material is metal, intermetallic compound, ceramic, or composite functional gradient material;
said metal is pure metal or alloy material that can be used in gas shielded welding or laser welding;
said intermetallic compound is an intermetallic compound material that can be used for surface cladding;
said ceramic is a ceramic material that can be used for surface cladding; and
said composite functional gradient material is a composite of said metal, said intermetallic compound, and said ceramic, or a composite having gradient-varied compositions.

4. The method of claim 1, wherein:
said welding gun is a plasma gun, a gas shielded gun, or a laser welding head;
said material is metal, intermetallic compound, ceramic, or composite functional gradient material;
said metal is pure metal or alloy material that can be used in gas shielded welding or laser welding;
said intermetallic compound is an intermetallic compound material that can be used for surface cladding;
said ceramic is a ceramic material that can be used for surface cladding; and
said composite functional gradient material is a composite of said metal, said intermetallic compound, and said ceramic, or a composite having gradient-varied compositions.

5. The method of claim 1, wherein:
said micro-roller or said micro-extrusion unit is fixed on a head of said welding gun;
said micro-roller comprises two first rollers adapted for respectively applying extrusion forces on said two side surfaces, and a second roller adapted for applying extrusion force on said top surface; and
said micro-extrusion unit comprises two first clamping plates adapted for respectively applying extrusion forces on said two side surfaces, and a second clamping plate adapted for applying extrusion force on said top surface.

6. The method of claim 1, wherein:
said micro-roller or said micro-extrusion unit is fixed on a numerical control processing head or on a robot wrist;
said numerical control processing head or said robot wrist is synchronous with said welding gun;
said micro-roller comprises two first rollers adapted for respectively applying extrusion forces on said two side surfaces, and a second roller adapted for applying extrusion force on said top surface; and
said micro-extrusion unit comprises two first clamping plates adapted for respectively applying extrusion forces on said two side surfaces, and a second clamping plate adapted for applying extrusion force on said top surface.

* * * * *